Dec. 9, 1969         L. H. BERND         3,483,132
BUBBLE DISSOLUTION CONTROL BY FILM FORMATION
Filed June 1, 1966         2 Sheets-Sheet 1
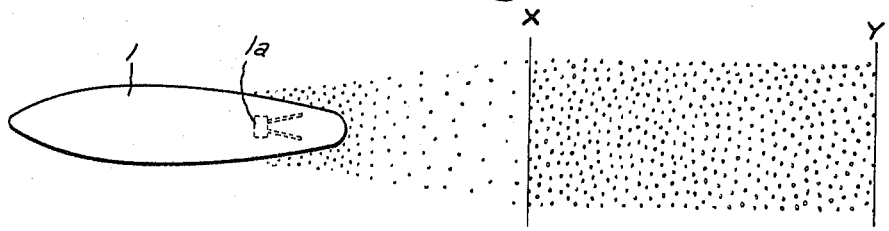
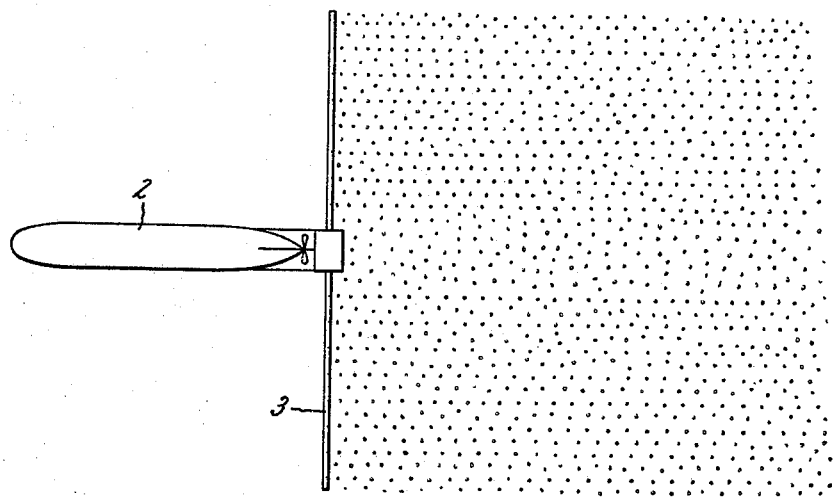
Inventor:
Leslie H. Bernd,
by Aurrien Mitchell
His Attorney.

Dec. 9, 1969     L. H. BERND     3,483,132
BUBBLE DISSOLUTION CONTROL BY FILM FORMATION
Filed June 1, 1966     2 Sheets-Sheet 2

Inventor:
Leslie H. Bernd,
by [signature]
His Attorney.

United States Patent Office 3,483,132
Patented Dec. 9, 1969

3,483,132
BUBBLE DISSOLUTION CONTROL BY
FILM FORMATION
Leslie H. Bernd, Altamont, N.Y., assignor to General
Electric Company, a corporation of New York
Filed June 1, 1966, Ser. No. 554,592
Int. Cl. B01j 13/00
U.S. Cl. 252—307                                    3 Claims

ABSTRACT OF THE DISCLOSURE

The dissolution of bubbles of air in a body of water is retarded by first introducing into the body of water slightly soluble surfactant material of long hydrocarbon chain molecular structure having a polar end such as alcohol and then introducing into the body of water a nonsurfactant, ionic material having a pair of polar ends such as starch to form double layered films about the bubbles.

---

My invention relates to a device and a process for the laying of false or deceptive indicator sonar detector means, and in particular, to the laying of such deceptive means by prolonging or controlling the size and life of bubbles in a selected portion of a wake. Such techniques would also be useful in making more uniform, and longer lasting wakes in active sonar training devices.

In the past as well as under present operating conditions, underwater acoustic energy is the best known agency for penetrating the capacity of the ocean. Today the use of asdic, the British equivalent of sonar, or active sonar is the principal detecting arm of submarines or counter-submarine agencies. The presenec of a surface vessel or a vessel that has just passed can be detected by a sonar indication from the wake. This is primarily due to the fact that the wake contains gas bubbles, which give the water in the wake a different effective compressibility and density, resulting in a different speed of sound and a different acoustic impedance. This produces refraction and reflection of a sonar wave. Also, the motion of the gas bubbles as they are excited by the sonar wave results in a higher absorption of acoustic energy than if no bubbles were present. Moreover, if the bubbles are of the proper size with respect to the sonar frequency, they can be made to resonate and thereby greatly increase absorption, as well as further alter the speed of sound to increaes the amount of refraction and reflection. From the above, it can be readily appreciated that the introduction of gas bubbles into the wake, also the prolonging of the life of these bubbles, as well as the maintenance of bubbles of a proper size, can give deceptive readings to a sonar system.

In fact, the use of underwater acoustic energy is ordinarily complicated by the fact that the sound may be channeled, refracted, reflected or absorbed by other things than ships. The ocean itself is like a giant layer cake composed of many stratifications of temperature and composition. Thus, sound may be diverted from its expected channels when it comes to the interface of any of these layers. It is well known that false indications are given to sonar devices when the wave hits a stream of cold water which is passing through warmer water and vice versa. Similarly, bubbles of air proceeding from the floor of the ocean may give a false indication. In general, a change in compressibility or speed of sound in the water (i.e., a change in the acoustic impedance) will cause refraction, reflection or both.

In modern conditions, the problem of escaping from sonar or asdic has become of even greater importance than formerly was the case. The advent of the true submersible, i.e., the nuclear power submarine magnifies the problem of dealing with the submarine because this submarine has an almost unlimited undersea range and a speed comparable with surface boats. A true submersible is forced to rely upon its sonar or asdic for its navigation, search, attack and escape almost entirely because all other means are of limited effectiveness. Thus, while the modern submarines range and speed is greatly increased, its sensing power is not increasing at the same rate.

In the past, the submarine has not been used against other submarines because its effectiveness against surface shipping was much higher. Further, the submarines effectiveness against surface shipping is limited because destroyers could count on the fact that a submersible would have to come to the surface at some time. In fact, the faster it ran and the longer it stayed submerged the more acute this problem became to the submersible. However, this restriction does not apply to the nuclear submarine and thus it has become effective to use specifically equipped "killer" subs in the warfare against submarines themselves.

Surface ships have been able to rely upon the limitations of conventional subs for their own protection. A surface ship uses for escape speed, the ability to lie behind something such as another ship or promontory of land and the protection of destroyers which divert the conventional sub from its intended target. However, surface ships cannot lie on the bottom as a means of escape from sonar as can a submersible.

It is readily appreciated that any means of giving a false indication to sonar will be most helpful in blunting the attack of the modern nuclear submarine.

In is a principal object of my invention to provide a false and confusing indication for sonar or asdic type detection means.

It is another object of my invention to preserve the gas bubbles in the wake of a vessel, by preventing or retarding their dissolving in water.

It is a further object of my invention to inject air into the water at or about the hull of ship's propeller to increase the amount of air in the wake when this is desirable, and to control bubble sizes so that the resultant bubbles in the wake are of proper dimensions.

Furthermore, it is an object of my invention to control the ultimate size of the bubbles as they exist in the wake by the degree to which the dissolving of the bubbles is permitted or prevented.

It is also an objective of my invention to create double surface films about bubbles when a surface film more effective than a monomolecular surface film is required. The double surface film consists of a monomolecular film reinforced or backed up by one or more molecular layers of ionic structural building materials.

In brief, my invention is the laying of spurious indicators for sonar detectors. The wake of a vessel will give an indication to sonar and if the bubbles which are in the wake stay in the wake for an appreciable length of time, then an indication will be given to sonar as though a vessel lay in the water at that point or had passed through that point. Slightly soluble (in water) long chain, surfactant materials such as primary amines, alcohols, fatty acids, also proteins, when added to a wake will cause preservation of the bubbles and thus provide a continuing false and confusing indication to enemy sonar. This occurs as a consequence of the film formed about the bubble by these materials, which in various ways prevents or retards dissolving. Care must be taken that the treated portion of the wake is approximately the same length and width as the vessel being simulated. The wake can be made even more lasting by the adding of a second material having an ionic character which will form a second layer over the surfactant.

FIGURE 1 illustrates an untreated wake caused by a vessel during its progress.

FIGURE 2 illustrates the wake of a vessel with a treated portion.

FIGURE 3 illustrates a torpedo with an air injection means to create a wide wake.

It has been experimentally determined that if water is cavitated, bubbles or gas nuclei form as the end product of voids produced in the water by the cavitation. These bubbles may be a millimeter or less in size. These air bubbles dissolve into the water or rise to the surface and go off. Thus, within a relatively short time the water that has been cavitated loses most of its air bubbles and is substantially the same as any water which has not been cavitated. The same thing occurs when gas bubbles are introduced by injection from a nozzle, or other means. It is to be noted that small gas bubbles such as gas nuclei rise very slowly, and so would remain in a wake for an extremely long time, were it not that they tend to dissolve.

It has been found as an experimental fact that if water which has occluded air bubbles or gas nuclei is treated with a film forming material of the proper type, the rate of dissolving is greatly slowed down. Furthermore, the film so formed can be modified to prevent all dissolving. Also, by proper choice of materials, a film can be formed that initially retards dissolving only slightly, subsequently acting to greatly retard (or prevent) dissolving after a given amount of dissolving has taken place. Hydrocarbons such as primary fatty acids, alcohols and amines have the property of slowing the rate of gas dissolving. Certain proteins such as egg albumen, as well as certain gelatins also have this effect. A gelatin that does this is Fischer G–7.

Dissolving of bubbles occurs because the water about the gas bubble is undersaturated in the amount of gas it can dissolve with respect to the pressure of the gas in the bubble. This occurs for two reasons. First, the surface tension of the water about the bubble acts to put the gas in the bubble under pressure. This increases as the bubble decreases in size. Additional pressure is produced by the head of water acting on the bubble; this component of the pressure increases with increasing depth. The resultant pressure in the bubble forces the gas to dissolve and diffuse into the surrounding water. Second, the mass of dissolved air in the ocean water per unit volume is approximately constant versus depth. The water immediately at the surface is in saturated equilibrium with the air above. Thus, the water is increasingly undersaturated with increasing depth, making for increased dissolving.

Materials to be used for film forming on nuclei to prevent or retard dissolving must have the following characteristics:

(1) Solubility in water in at least trace quantities.

(2) "Surfactant" material, i.e., the material migrates to the surface an forms a monomoleuclar film. Thus, a low concentration of material in solution will become a high concentration at the surface.

Figure 4:
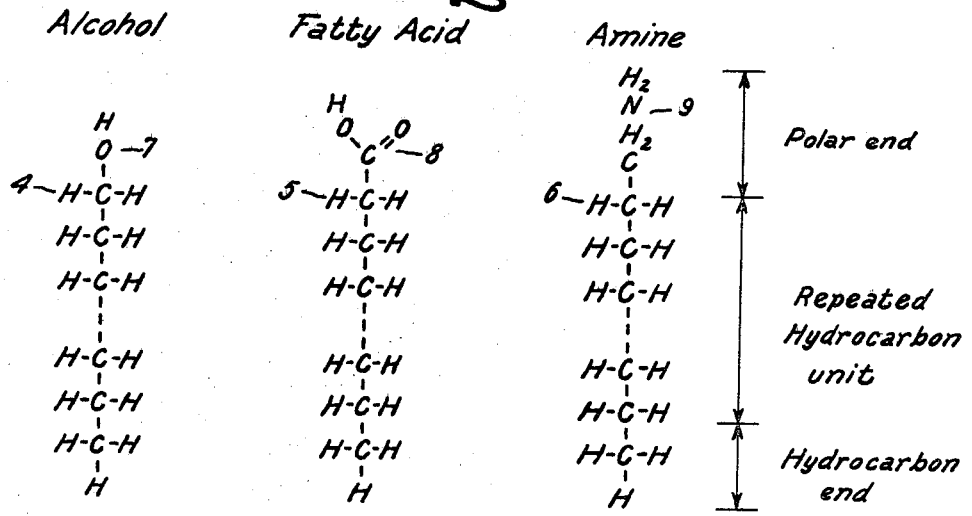
FIGURE 4 shows the structural type of primary long chain, surfactant hydrocarbons.
Figure 5:
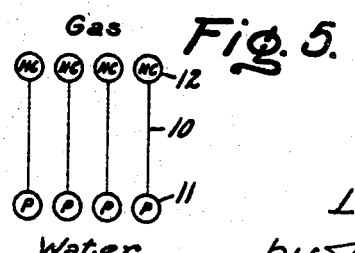
FIGURE 5 shows a typical monomolecular film at a gas water interface.

To obtain the effect, a hydrocarbon molecule should be at least about 12 carbon atoms long (FIGURE 4). One end should be highly attractive to water, i.e., polar, and the other end should be less attractive, i.e., nonpolar (FIGURE 5). However, with increasing molecular size the solubility and rate of diffusibility to the surface goes down. The molecule is then not available in adequate quantities in the water or cannot move to the surface. Thus, the most effective molecular lengths are those containing 12 to 18 carbon atoms.

(3) A strong and elastic surface film should be formed. A primary, long chain hydrocarbon film is strong in compression. Some protein surface films are exceedingly strong, elastic, and durable. Strength and durability are desirable for various reasons. When a bubble is large it is readily broken. A strong film prevents breakdown and dispersal of the bubble. Also, a continuous film is maintained to act as a barrier to gas diffusion.

In addition, as a bubble dissolves, the film material about the bubble is compacted and compressed as the surface area of the bubble decreases. This further increases the effectiveness of the film as a barrier to diffusion, as well as providing a structural force that opposes the surface tension, thereby reducing the pressure in the gas contained within the bubble that makes for dissolving. A strong film can thus completely prevent dissolving after some initial dissolving has taken place.

(4) The film should form a barrier to gas diffusion. A primary, long chain hydrocarbon possessing no side branches is needed in order to make a compact barrier to gas diffusion. Also, increasing the molecular weight decreases the permeability of the film to gas diffusion.

(5) The film once formed should stay in place and not redissolve.

Soluble surfactant proteins form a thin film about a bubble in a manner similar to a hydrocarbon as previously described. This film prevents the escape of air into the water. The film is one molecule thick. The film opposes the dissolving of bubbles by providing a barrier to the diffusion of the gas from within the bubble to the surrounding water as well as opposing the surface tension acting around the bubble. This action happens when protein migrates to the surface of a gas nuclei or bubble and is collected on this surface as the bubble initially dissolves due to surface tension. As the air bubbles become quite small, their rate of dissolution is proportionately less and less compared to normal air bubbles.

As can be appreciated, control of the degree to which dissolving is retarded, can be affected by selecting the molecular weight and the type of material to be added to the water. The initial concentration of additive (mass of material per unit volume of water) also affects performance and so can be used as a means of control.

In addition, a transition from little to high retarding, or a little retarding to complete prevention of dissolving, can also be controlled by a proper selection of materials. The initial concentration of additive also determines the point at which this transition takes place. Thus, it can be readily seen that bubble size in a wake can be controlled, given a typical initial size of bubble produced by gas injection, cavitation or ingestion of air by the hull. Rate of bubble dissolution can also be slowed to a minimum at an appropriate point by adding the second material to the water at the exact point when the bubble size gives the optimum compressibility and speed to the sonar wave.

FIGURE 1 illustrates the wake formed by a submarine or surface vessel 1 in its passage through the water. The vessel is sufficiently close to the surface that its propellers cavitate. The vessel in passing from right to left creates a wake of air bubbles and swirling water. In time, the wake dissolves into the water as shown to the right hand side of the drawing. The larger bubbles will proceed to the surface of the water and the smaller bubbles will stay approximately where they were formed subject to the swirling action of the turbulent water. The part of the wake to the left will give a reflection on a sonar screen but as one proceeds to the older parts of the wake toward the right, there will be less and less reflection on the sonar screen.

FIGURE 2 shows a submarine or surface craft 1 travelling from right to left with a wake. The wake is a normal wake but has one section X-Y which has been treated through dispensing means 1a. This section of the wake will present characteristics to sonar similar to that of the original vessel. It is thus seen that if several of these treated wakes are formed, a killer submarine or a destroyer will have difficulty distinguishing the spurious from the real. This will help the hunted submarine or surface craft to evade detection. Also, long lasting trials can be laid. These trails will exist in the water long after the water craft which caused them has left the area. A vessel detecting these trials will gain the indication that another vessel has been in the area recently while the wake creating vessel may have been gone for quite some time.

FIGURE 3 shows a torpedo with air injection and liquid injection means 2 to create a wide wake. The torpedo 2 will be launched from a marine vessel and will run giving a wake of size to indicate a much larger vessel. The air injection means 3 can be a thin pipe having holes in it or the like extending laterally from the torpedoes. High air pressure and small nozzle sizes are desirable when small bubbles are to be produced.

FIGURE 4 shows an alcohol chain 4, a fatty acid 5 and an amine 6. The chains are linear, possessing no side branches. On one end of the alcohol is the OH radical 7 which is the polar end of the alcohol, the other part of the alcohol is nonpolar. Thus, when the alcohol comes to a surface of water its tendency is to orient itself with the OH radical in the water, which itself is polar, and the hydrocarbon elements out of the water. In a similar way, a fatty acid will orient itself with a COOH element 8 or section in the water whereas the rest of the hydrocarbon will tend to be disposed away from the surface of the water. The properties of an amine in this respect are similar because an amine has an $NH_2$ radical 9 which forms the polar end and a $CH_2$ unit at the other end which is hydrocarbon and nonpolar. Hence the $NH_2$ radical will also tend to be attracted preferentially to water which is polar in nature. By means of the molecular composition and structure indicated above, primary alcohols, primary fatty acids and primary amines will tend to form a compact monomolecular film upon the surfaces of water in which they are dissolved.

FIGURE 5 shows an orientation of hydrocarbon molecules 10 in a monomolecular film at the surface of water in which they are dissolved. This surface can be a bubble or the normal water surface. As shown here, the polar ends 11 are all down into the water while the hydrocarbon ends 12 stand up into the gas forming a barrier to the evaporation of the gas into or through the water. When standing on its longitudinal axis perpendicular to the plane of the water, a linear hydrocarbon will occupy a cross sectional area of about 21 square Angstroms.

Figure 6:
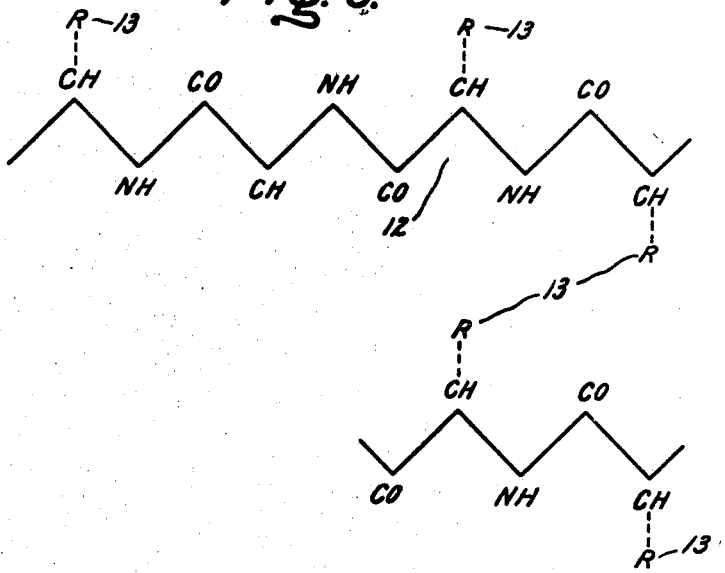
FIGURE 6 shows a highly magnified view of a protein film looking down on the surface of the water.

A typical example of protein film structure is shown in FIGURE 6. In this figure a protein is shown having its polar radical in the water and designated here as R, whereas the rest of the protein more or less floats upon the surface of the water. The polar radical is attracted down into the water, permitting adjacent protein molecules to approach on close centers as the surface film is compressed thus offering a barrier to diffusion and appreciable force to oppose compression.

The distance between protein molecules is thought to be on the order of 4.5 to 5 Angstrom units. The molecular elements 12 which form the backbone of the structure are called peptide links. Attached to this backbone are hydrocarbons 13 from 1 to 6 repeating units long, or chains with a COOH or $NH_2$ radical at the end. These chains may be stretched out on the surface of the water but the $NH_2$ or COOH element is usually keyed into the water. From the considerations above, it can be seen that the area of approximately 17 square Angstrom units that would be covered by each R chain is somewhat less than the spacing of the chains in a compressed hydrocarbon film.

Thus, a protein film is thinner than a hydrocarbon film but under favorable circumstances could have smaller spacings between adjacent molecular groups. However, because of the basic dimensions the two types of film are about the same, the resistance to diffusion of a suitable protein film should be approximately on the same order of magnitude. This has been experimentally shown to be the case for egg albumin.

Figure 7:
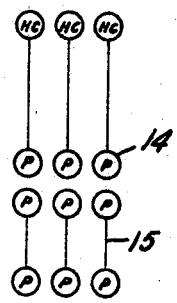
FIGURE 7 shows a typical double film consisting of a monomolecular film backed up by ionic structural-building materials.

It is further possible to take a monomolecular surface film, and by building a second film about it, make a more effective surface film in retarding dissolving than if the second film were not present. In fact, by such means, it is possible to make a surface film that prevents all dissolving from virtually the inception of a bubble. The molecular formation of a double film is shown in FIGURE 7.

This is done in the following manner. A nonsurfactant, ionic material such as a gelatin, starch, or sugar, is added to the water in addition to the surfactant used to form the monomolecular film. It also may be added after the monomolecular film has been formed. Once the monomolecular film has formed about the bubble, the polarionic groups 14 of the monomolecular film that face the water attract the ionic material 15 which then deposits upon the monomolecular film. This deposit makes the monomolecular film a more effective barrier to gas diffusion, as well as a stronger film. Care must, however, be taken that the ionic structural building material does not contain any surfactant materials; these will compete with the surfactant material used to form the monomolecular film and prevent a compact film from forming if the two types of materials are premixed. Also, if the ionic material is premixed with the surfactant, the mixture must be made to flow, or be mixed and sheared sufficiently so that bonds are not formed between the two materials which will alter the essential character of each.

Some advantages of my invention are that it affords a means for controlling or preventing dissolving of bubbles. The strength of the bubble, i.e., the degree to which it opposes surface tension as it is compressed, can be controlled by controlling concentration of the solution, so as to halt the diffusion at a suitable point. Furthermore, the addition of suitable amounts of a second material, i.e., an ionic structural building material will cause an abrupt halt in gas diffusion and bubble shrinkage. Thus, the second layer is an auxiliary means of control which will also produce a more durable bubble.

Although my invention has been shown and illustrated in connection with the wake of a watercraft, it is obvious that modifications are within the scope of my invention. For example, "bumping" in boiling water can be avoided and lubricated bearings will have better load bearing capacity if the oil or water has small gas inclusions to prevent the acquisition of tensile strength by the liquid. Accordingly, my invention is to be considered as limited only by the scope of the appended claims.

What I claim as new and desire to secure by Letters Patent of the United States is:

1. The method of retarding the dissolution of air from bubbles of said air in a body of water comprising
    introducing into said body of water in the vicinity of said bubbles a slightly soluble long chain surfactant material selected from the group consisting of primary fatty acids, alcohols, and amines whereby molecules of said material diffuse to the surfaces of said bubbles with the polar radicals thereof aligned with and adjacent to the water surfaces of said bubbles to form monomolecular layers of said material about said bubbles,
    introducing into said body of water in the vicinity of said bubbles a nonsurfactant, ionic material selected from the group consisting of gelatin, starch and sugar whereby molecules of said nonsurfactant, ionic material migrate to the polar radicals of said surfactant material formed about said bubbles to form layers of said nonsurfactant, ionic material about layers of said surfactant material on said bubbles, thereby providing a double layer barrier to the dissolution of air from said bubbles of air.

2. The method of claim 1 in which said nonsurfactant, ionic material is introduced subsequently to the introduction of said surfactant material.

3. The method of increasing the compressibility of a body of water comprising cavitating said body of water to form bubbles therein, adding to said body of water in the vicinity of said bubbles a slightly soluble long chain surfactant material selected from the group consisting of primary fatty acids, alcohols and amines to form a first bubble dissolution retarding film about said bubbles, adding to said water in the vicinity of said bubbles a nonsurfactant, ionic material selected from the group consisting of gelatin, starch and sugar to form a second bubble dissolution retarding film about said bubbles.

References Cited
UNITED STATES PATENTS

| | | | |
|---|---|---|---|
| 1,777,247 | 9/1930 | Bayer | 252—307 |
| 1,782,383 | 11/1930 | Greider | 252—307 |
| 1,807,810 | 6/1931 | Rice | 252—307 |
| 2,971,458 | 2/1961 | Kumins et al. | 252—307 X |
| 3,242,051 | 3/1966 | Hiestand et al. | 117—100 X |

RICHARD D. LOVERING, Primary Examiner

U.S. Cl. X.R.

114—20